United States Patent [19]

Bubik et al.

[11] Patent Number: 5,116,477
[45] Date of Patent: May 26, 1992

[54] DRAINAGE DEVICE IN A DOUBLE-SIEVE MOLD

[75] Inventors: Alfred Bubik, Ravensburg; Otto Hildebrand, Ravensburg-Taldorf, both of Fed. Rep. of Germany

[73] Assignee: Sulzer-Escher Wyss GmbH, Ravensburg, Fed. Rep. of Germany

[21] Appl. No.: 614,934

[22] Filed: Nov. 16, 1990

Related U.S. Application Data

[63] Continuation of Ser. No. 340,874, Apr. 20, 1989, abandoned.

Foreign Application Priority Data

May 5, 1988 [DE] Fed. Rep. of Germany ....... 3815316

[51] Int. Cl.⁵ .......................... D21F 1/36; D21F 1/48
[52] U.S. Cl. ................... 162/301; 162/300; 162/352
[58] Field of Search ............... 162/300, 301, 345, 352, 162/374; 210/400

[56] References Cited

U.S. PATENT DOCUMENTS

| | | | |
|---|---|---|---|
| 3,017,930 | 1/1962 | Dunlap | 162/352 |
| 3,425,901 | 2/1969 | Koffskey, Jr. | 162/352 |
| 3,432,385 | 3/1969 | Thorp | 162/352 |
| 3,520,775 | 7/1970 | Truxa | 162/352 |
| 3,535,201 | 10/1970 | Reynold et al. | 162/352 |
| 3,578,561 | 5/1971 | McCarrick et al. | 162/352 |
| 3,922,190 | 11/1975 | Cowan | 162/352 |
| 4,459,175 | 7/1984 | Bubik et al. | 162/300 |
| 4,687,549 | 8/1987 | Kallmis | 162/352 |
| 4,769,111 | 9/1988 | Nevalainen et al. | 162/301 |

FOREIGN PATENT DOCUMENTS

| | | | |
|---|---|---|---|
| 251778 | 1/1988 | European Pat. Off. | 162/301 |
| 3138133 | 3/1983 | Fed. Rep. of Germany | 162/301 |
| 3406217 | 10/1985 | Fed. Rep. of Germany | 162/301 |

Primary Examiner—Karen M. Hastings
Attorney, Agent, or Firm—Wolf, Greenfield & Sacks

[57] ABSTRACT

An extended drainage strip (3) is placed next to the primary sieve (5) of a double-sieve mold. It has a liquid-intake space (2), which is disposed between the part of the surface (4) facing the sieve and the sieve (5). Disposed next to the other sieve (6) is at least one adjustable strip (7) arranged so that it can be placed opposite the intake space (2). Intake space (2) has a cross-sectional size that increases, if necessary, in the direction in which the liquid flows. By pressing the adjustable strip (7) against the intake space (2) of the extended strip (3), the shape of the intake space (2) can be controlled, and the suction or intake of the liquid in the intake space (2) is regulated. One object is to achieve steadily increasing suction in the flow direction. This result assists in preventing undesired pressure surges. The drainage device is simplified and thus easy to monitor. Drainage proceeds carefully, with higher retention of fine particles in the sheet of material between the sieves.

11 Claims, 3 Drawing Sheets

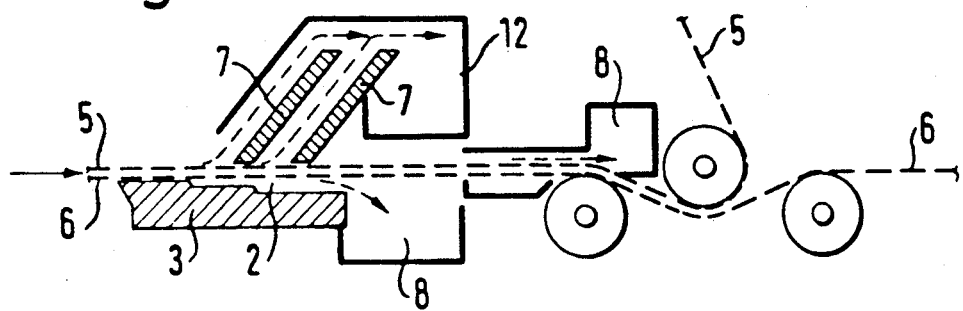
Fig. 4
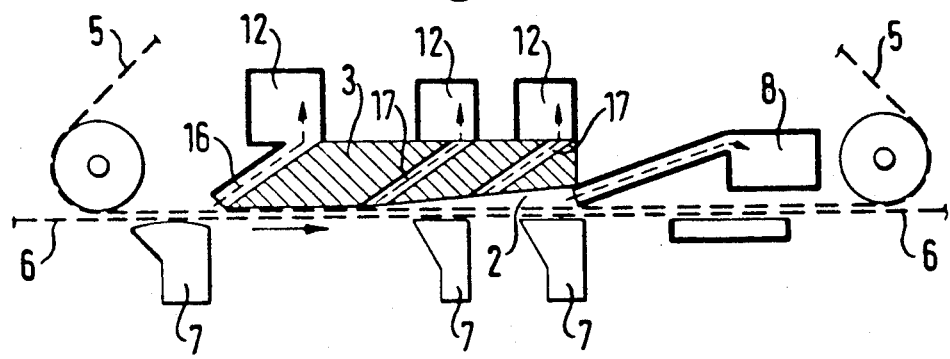
Fig. 5
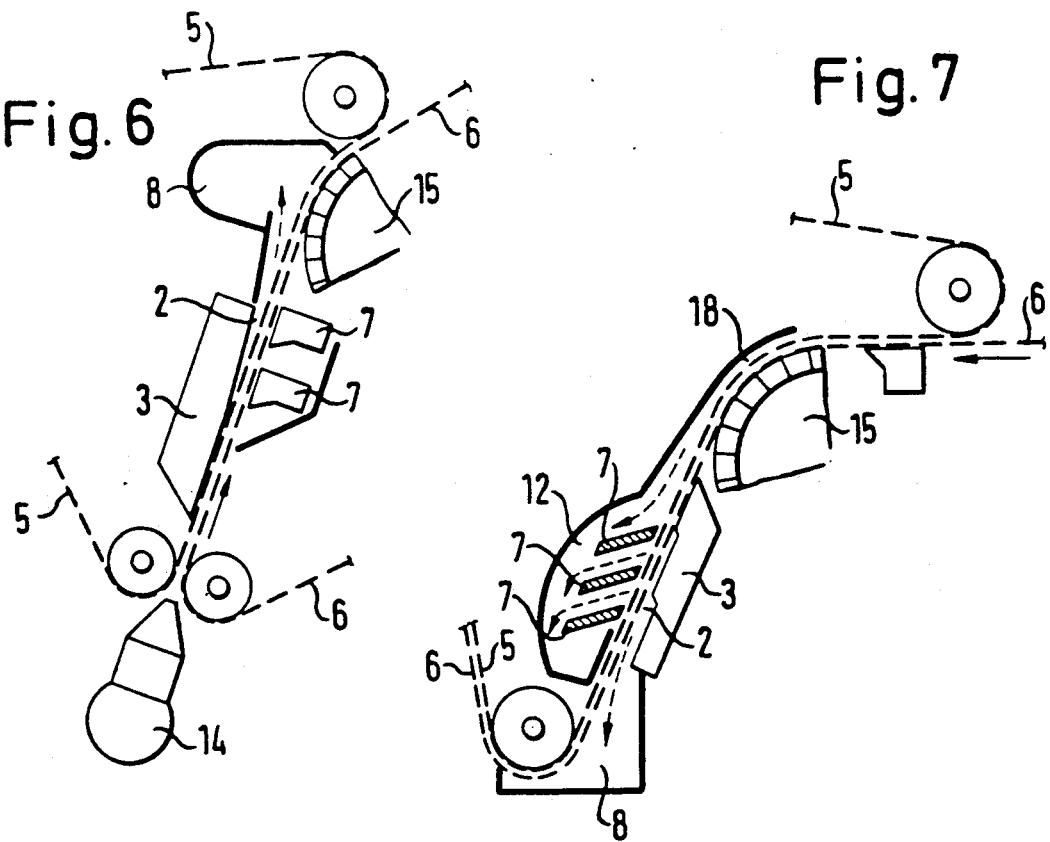
Fig. 6
Fig. 7

DRAINAGE DEVICE IN A DOUBLE-SIEVE MOLD

This application is a continuation of application Ser. No. 07/340,874, filed Apr. 20, 1989, now abandoned.

FIELD OF THE INVENTION

This invention relates generally to an improved device for draining a double-sieve mold.

BACKGROUND OF THE INVENTION

Devices are known in which an extended strip is located beneath the bottom one of two sieves in a mold when the sieve guide is horizontal. Although such devices drain or suction well, they have the disadvantage that the draining or suctioning cannot be sufficiently regulated as desired without the use of complicated structures. As a result, too many fine particles from the sheet of material can be washed away. This disadvantage cannot be overcome without changing the shape of the liquid intake space, so that, if necessary, a mold with another shape must be used to minimize the pressure surges that disturb the drainage process.

Systems are known, for example as shown in European Patent Application No. EP-A-O 160, 615, in which short strips are arranged in intervals one after another in the flow direction to generate a small amount of pressure on the sieve and thus to achieve smaller but more frequent pressure surges. Other systems are known in which on both sides of the sieves there are groups of short strips, where the strips are displaced from one another in the flow direction of the sieves, so that one strip in a row on one side of the sieve is disposed opposite an empty space between two strips of the row on the other side of the sieve. These systems are, however, complicated to build as well as to handle. At high machine speeds there are particularly high pressure forces at work because the water films diverted to the strips separate the fine substances from the fabric.

One object of the invention is to create a simple device by which drainage is influenced and retention of the fine particles in the material layer is improved.

SUMMARY OF THE INVENTION

This invention relates generally to a drainage device for a double sieve mold which includes a liquid intake formed by a drainage mold extending in the direction of the sieves and in which the space between a surface of the mold facing the sieves and the sieves increases in the direction of flow. The foregoing and other objects and advantages of the invention are achieved by placing the drainage mold adjacent one of the sieves and by the provision of at least one adjustable mold disposed opposite the drainage mold surface and adjacent the other of the sieves. The shape of the liquid intake space adjacent the adjustable mold and the vacuum effect of the space, and, if necessary, the flow path of the sieves can be changed as needed or desired.

The suction effect in the region of the liquid intake space is changed by displacing the surface of the adjustable mold so that the effective shape of the liquid intake space is changed by positioning of the sieves. In this fashion, useful angles, steps, arches and the like are formed by the sieves in the liquid intake space, so that undesired pressure surges during drainage, can, for the most part, be minimized. The drainage pressure over a long drainage length, for example over 1000 mm, can thus be maintained and a large quantity can be drained.

DESCRIPTION OF THE DRAWINGS

The objects, advantages and features of this invention will be more clearly appreciated from the following detailed description when taken in conjunction with the accompanying drawings in which:

FIG. 4 is a schematic side view showing another further embodiment of the double sieve mold of this invention;

FIG. 5 is a schematic side view showing yet another further embodiment of the double sieve mold of this invention;

FIG. 6 is a schematic side-view showing yet another further embodiment of the double sieve mold of this invention; and FIG. 7 is a schematic side-view showing yet another further embodiment of the double sieve mold of this invention.

DETAILED DESCRIPTION OF THE PREFERRED EMBODIMENTS

Figure 1:
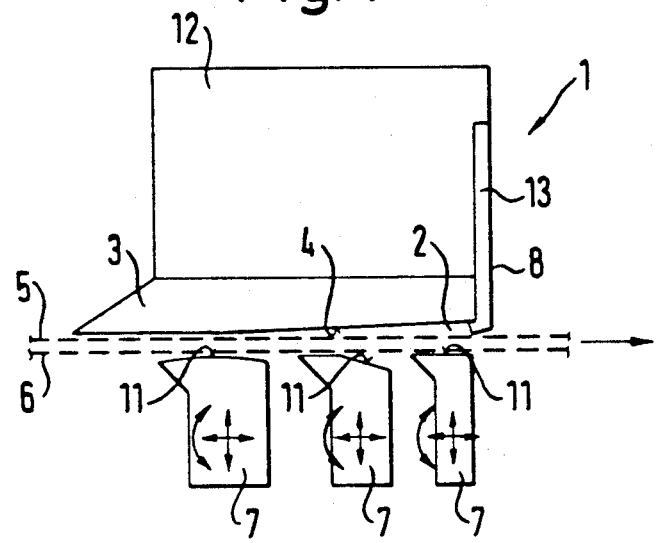
FIG. 1 is a schematic, side-view of the double-sieve mold of this invention.

With reference now to the drawings, and more particularly to FIG. 1 thereof, a device for a double sieve mold made in accordance with this invention will now be described. This device includes an extended drainage strip 3, which runs lengthwise of a double-sieve mold 1 and which is placed adjacent a first sieve 5. In a part of strip 3 which lies behind a flat surface, there is a liquid intake space 2, which is bordered on the one side by part of the bottom surface 4 of the strip 3 and on the other side by a part of sieve 5. Intake space 2 can, as shown in FIG. 1, also have a cross-sectional size that becomes continuously larger in the flow direction (see arrow) of sieves 5 and 6. As shown in the other figures, space 2 can also have a shape that becomes larger in stages. This configuration results in a suction effect that increases steadily or in stages during the intake of the liquid through the sieve 5 from the sheet of material which is located between the sieves 5 and 6 and which is to be carefully drained.

Figure 1A:
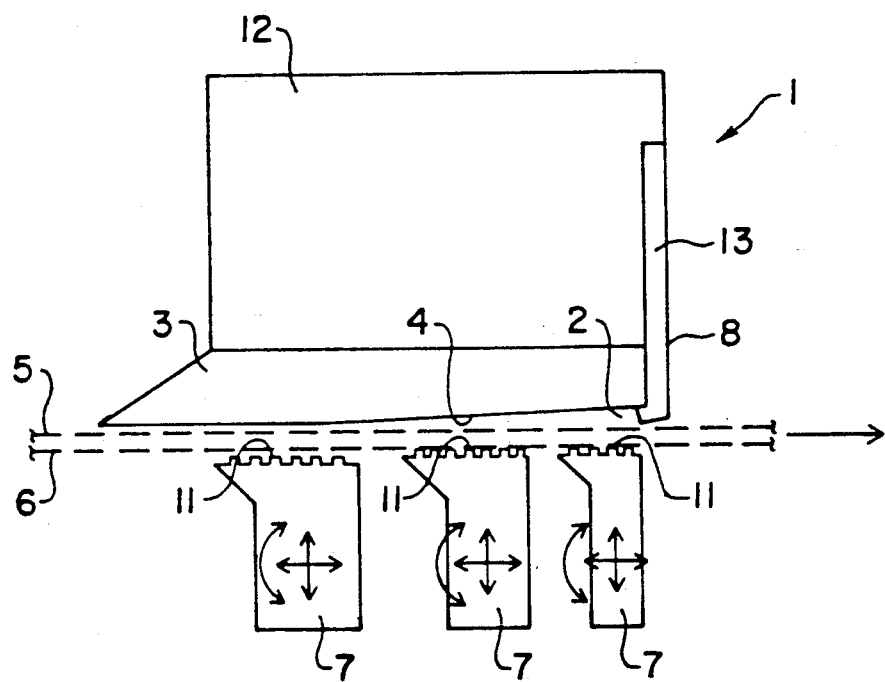
FIG. 1A is a schematic side view of the double-sieve mold of the invention, further showing toothed projections.

To affect or control this suction process, adjustable strips 7 are located beneath a second sieve 6. By displacement of strips 7 with respect to sieve 6 or with respect to the sheet of material and first sieve 5, the cross-sectional shape of space 2 can be changed as needed. It is thus possible to achieve the desired dimensions of the profile for space 2. By moving the sieves in relation to the sheet of material, various angles, steps or arches can be achieved whereby the intake of liquid or the suction effect of space 2 can be adjusted. Through the use of several strips 7 along the length of space 2 the procedure can be refined, so that larger, damaging pressure surges can be avoided. Surfaces 11 of strips 7 facing the sieve are constructed in a particularly advantageous fashion for just this purpose: strips with evenly constructed surfaces can be designed with surfaces 11 disposed convex to or at an angle to sieve 6. The strips are fully adjustable. i.e., they can be designed to be pushed or turned. These features are shown in the drawing by corresponding arrows. The surfaces 11 can also have graded or toothed projections, which are shown in the FIG. 1A.

A device 8 is provided for draining off the liquid in the space 2 at the end of space 2. As shown in FIG. 1, a trough-like collection space 12 is disposed directly over strip 3 and the liquid is fed into this collection space as a result of its kinetic energy. If there is not enough of this energy, collection space 12 and the path can be placed in a vacuum. Another version of the liquid run off is also within the scope of this invention, for example one such as shown by device 8 in FIG. 2.

A preferred length of extended strip 3, is about 600 mm. Of course, this length is not essential. The length can be longer or shorter. In actuality, the length of strip 3 must correspond to the dimension of the mold 1 and the job it is doing. The position of strip 3 can be adjusted in relation to sieve 5.

Figure 2:
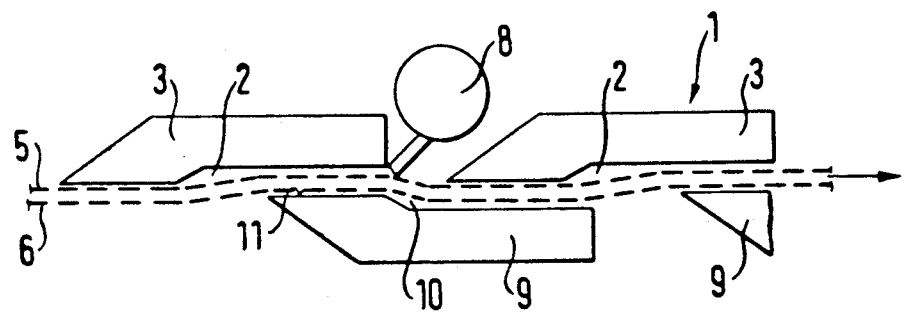
FIG. 2 is a schematic, side-view showing another embodiment of the double sieve mold of this invention.
Figure 3:
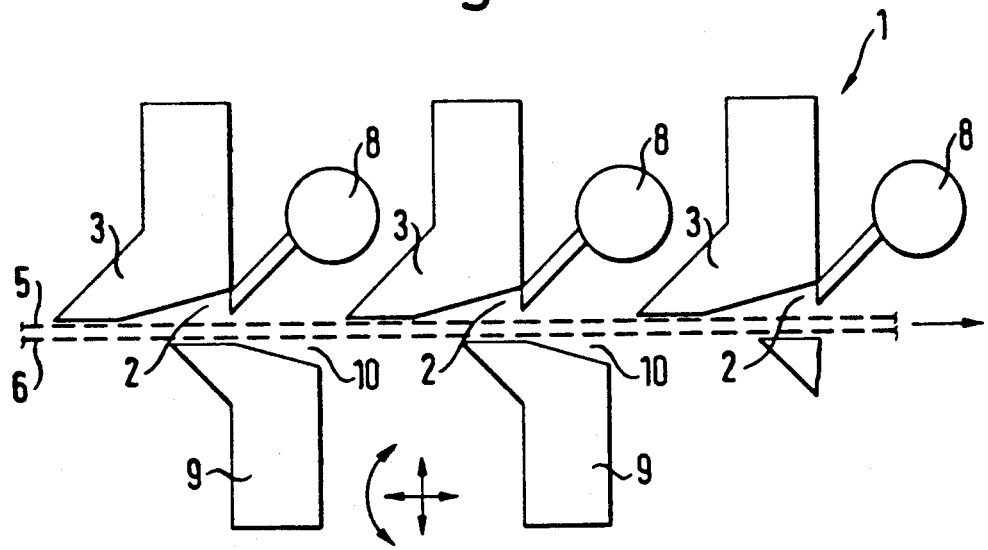
FIG. 3 is schematic, side-view showing a further embodiment of the double-sieve mold of this invention.

In FIGS. 2 and 3, there is shown a system of multiple extended upper strips 3 arranged one behind the other in a double-sieve mold with a horizontal sieve action. Like numbers are used for like parts, where possible. Extended lower strips 9 are also placed under the lower sieve 6. Upper strips 3 and lower strips 9 are designed to be mirror images of one another in the flow direction. This causes the front part of the strips, which lie in front of the liquid intake spaces 2 and 10, to exert pressure in the direction of the liquid intake space 2 or 10. The surfaces of the front part of the strips 3 and 9 facing a sieve can be shaped advantageously, as with the previously mentioned strips 7.

According to FIG. 4 where like numbers are used for like parts, where possible, extended strip 3 is disposed under sieve 6, and strips 7 are disposed along and above upper sieve 5. Strips 7 have inclined surfaces, along which the liquid from sieve 5 runs into collection space 12. Another part of the liquid runs off from sieve 5 into collection device 8 arranged at the outlet of the sieve. Thus, the kinetic energy of the liquid is used by deflecting the sieve to a deflection cylinder so that no vacuum is necessary in device 8.

According to FIG. 5, where like numbers are used for like parts where possible, a drainage device is shown with a path 16 in front of extended strip 3. Paths 17 also are provided for the liquid from space 2 to pass under strip 3 through to the inside of strip 3.

FIGS. 6 and 7 show use of the device of this invention on a mold with a non horizontal sieve path, and like numbers are used for like parts, where possible.

According to FIG. 6, the suspension is sprayed from below out of a material outlet 14 between sieves 5 and 6. The liquid from space 2 runs off by kinetic energy into the collection device. This run off is facilitated by the curving configuration of curved surfaces 15. The liquid is fed from the sieve 6 to the strips 7, where the remainder is carried off on curved surfaces 15, which include a suction cylinder.

According to FIG. 7, the suspension is poured in from above between sieves 5 and 6. Pre-drainage takes place on the curved surfaces, which include a suction cylinder which takes up the fluid from sieve 6. As a result of centrifugal force, the liquid flows out of the sieve 5 on a path 18 and further down into a collection space 12, where it joins the liquid running off along strips 7, which are angularly disposed with respect to space 2 of extended strip 3. The liquid from sieve 6 flows out of space 2 of strip 3 and down into collection device 8.

In view of the above description, it is likely that modifications and improvements may occur to those skilled in the art within the scope of this invention. Thus the above description is intended to be exemplary only, and the scope of the invention is defined only by the following claims and their equivalents.

What is claimed is:

1. A drainage device in a double-sieve mold having a first flexible wire sieve and a second flexible wire sieve, means for positioning said first sieve parallel to, but spaced from, said second sieve to form a sandwich with a paper suspension between said first and said second sieves and means for moving said sandwich in a flow direction, said drainage device comprising:

means defining a single first mold surface extending along said flow direction, said first mold surface being mounted in a fixed relationship to said first sieve so that said first mold surface is adjacent to, but spaced from, said first sieve in order to define a liquid intake space having a width between said first mold surface and said first sieve;

means defining a plurality of second mold surfaces, said plurality of second mold surfaces being located on the opposite side of said sandwich from and opposite said single first mold surface and contacting said second sieve; and means for moving each of said second mold surfaces relative to said single first mold surface so that said sandwich is moved relative to said single first mold surface whereby said liquid intake space width can be adjusted along said flow direction.

2. A drainage device in a double-sieve mold according to claim 1 wherein the means for moving said plurality of second mold surfaces relative to said first mold surface is capable of moving said plurality of second mold surfaces angularly, perpendicularly, and parallely relative to said sieves during operation.

3. A drainage device in a double-sieve mold according to claim 1 wherein said means for moving said plurality second mold surfaces is adjusted so that said liquid intake space width continuously increases along said flow direction.

4. A drainage device in a double-sieve mold according to claim 1 wherein said first mold surface is planar.

5. A drainage device in a double-sieve mold according to claim 1 wherein said first mold surface has a front surface adjacent to, but spaced from, said first sieve by a first distance and a rear surface adjacent to, but spaced from, said first sieve by a second distance greater than said first distance so that a liquid intake space is defined between said first mold surface and said first sieve in which the width of said liquid intake space increases by a step along the direction of said flow.

6. A drainage device in a double-sieve mold according to claim 1 further comprising means for applying a vacuum to said liquid intake space to draw off liquid collecting therein.

7. A drainage device in a double-sieve mold according to claim 1 wherein said plurality of second mold surfaces are substantially planar.

8. A drainage device in a double-sieve mold according to claim 1 wherein said plurality of second mold surfaces are substantially planar and are positioned parallel to said sandwich.

9. A drainage device in a double-sieve mold according to claim 1 wherein said plurality of second mold surfaces are substantially planar and are positioned parallel to said sandwich in a direction transverse to said flow direction and are positioned at an angle with respect to said sandwich in a direction parallel to said flow direction.

10. A drainage device in a double-sieve mold according to claim 1 wherein said plurality of second mold surfaces each have a convex shape in said flow direction with the center of each of said surfaces approaching said sandwich closer than the edges of said surfaces.

11. A drainage device in a double-sieve mold according to claim 1 wherein each of said plurality of second mold surfaces comprises a plurality of tooth-like structures in said flow direction.

* * * * *